(12) United States Patent
Gayout et al.

(10) Patent No.: US 10,539,822 B2
(45) Date of Patent: Jan. 21, 2020

(54) GLAZING UNIT COMPRISING A VARIABLE LIGHT SCATTERING SYSTEM AND A PAIR OF ABSORBING ELEMENTS

(71) Applicant: Cardinal IG Company, Eden Prairie, MN (US)

(72) Inventors: Patrick Gayout, Villemomble (FR); Emmanuel Mimoun, Paris (FR)

(73) Assignee: Cardinal IG Company, Eden Prairie, MN (US)

(*) Notice: Subject to any disclaimer, the term of this patent is extended or adjusted under 35 U.S.C. 154(b) by 106 days.

(21) Appl. No.: 14/439,618

(22) PCT Filed: Oct. 31, 2013

(86) PCT No.: PCT/FR2013/052607
§ 371 (c)(1),
(2) Date: Apr. 29, 2015

(87) PCT Pub. No.: WO2014/068257
PCT Pub. Date: May 8, 2014

(65) Prior Publication Data
US 2015/0301366 A1    Oct. 22, 2015

(30) Foreign Application Priority Data

Oct. 31, 2012  (FR) ...................................... 12 60426

(51) Int. Cl.
*G02F 1/1334*    (2006.01)
*B32B 17/10*    (2006.01)
(Continued)

(52) U.S. Cl.
CPC ......... *G02F 1/133509* (2013.01); *G02B 5/22* (2013.01); *G02F 1/1334* (2013.01)

(58) Field of Classification Search
CPC .......... B32B 17/10504; B32B 17/1077; B32B 17/1011; B32B 17/10788; G02F 1/133509;
(Continued)

(56) References Cited

U.S. PATENT DOCUMENTS

| | | |
|---|---|---|
| 4,891,152 A | 1/1990 | Miller et al. |
| 5,408,353 A | 4/1995 | Nichols et al. |

(Continued)

FOREIGN PATENT DOCUMENTS

| | | |
|---|---|---|
| EP | 0272585 A3 | 11/1989 |
| EP | 0564869 A1 | 10/1993 |

(Continued)

OTHER PUBLICATIONS

International Search Report from International Application PCT/FR2013/052607, dated Jan. 27, 2014, 7 pages.

(Continued)

*Primary Examiner* — Paul C Lee
(74) *Attorney, Agent, or Firm* — Fredrikson & Byron, P.A.

(57) ABSTRACT

The invention relates to a glazing unit comprising a substrate coated with a variable light scattering system switching between a transparent state and a translucent state comprising a scattering layer able to scatter the incident light along scattering angles greater than the critical total internal reflection angle at the interface between the substrate and the air and at least one pair of elements absorbing visible light separated from one another at least by the scattering layer. The invention also relates to the use of said glazing unit as a projection or back-projection screen.

12 Claims, 3 Drawing Sheets

(51) Int. Cl.
*C09K 19/54* (2006.01)
*G02B 5/02* (2006.01)
*G02F 1/1335* (2006.01)
*G02B 5/22* (2006.01)

(58) Field of Classification Search
CPC ... G02B 5/22; C09K 19/544; C09K 2019/546
See application file for complete search history.

(56) References Cited

U.S. PATENT DOCUMENTS

| | | | |
|---|---|---|---|
| 5,686,017 A | 11/1997 | Kobayashi et al. | |
| 5,945,209 A * | 8/1999 | Okazaki | G02B 1/111 |
| | | | 428/304.4 |
| 5,958,290 A | 9/1999 | Coates et al. | |
| 5,976,405 A | 11/1999 | Clikeman et al. | |
| 6,005,651 A | 12/1999 | Takahara et al. | |
| 6,271,899 B1 | 8/2001 | Lewis et al. | |
| 6,295,102 B1 | 9/2001 | Higa et al. | |
| 6,379,788 B2 * | 4/2002 | Choi | G02B 1/111 |
| | | | 427/164 |
| 6,429,961 B1 | 8/2002 | Harary et al. | |
| 6,661,486 B1 | 12/2003 | Faris et al. | |
| 7,342,704 B2 | 3/2008 | Yano | |
| 7,525,604 B2 | 4/2009 | Xue | |
| 7,755,829 B2 | 7/2010 | Powers et al. | |
| 7,837,897 B2 | 11/2010 | Ihang et al. | |
| 8,102,478 B2 | 1/2012 | Xue | |
| 8,187,682 B2 | 5/2012 | Albrecht et al. | |
| 2001/0028501 A1 * | 10/2001 | Hunter | G02F 1/135 |
| | | | 359/449 |
| 2001/0033400 A1 | 10/2001 | Sutherland et al. | |
| 2003/0193709 A1 | 10/2003 | Mallya et al. | |
| 2005/0142379 A1 * | 6/2005 | Juni | G02B 5/0242 |
| | | | 428/690 |
| 2006/0290843 A1 * | 12/2006 | Epstein | G02B 5/021 |
| | | | 349/113 |
| 2007/0188849 A1 | 8/2007 | May | |
| 2007/0274701 A1 * | 11/2007 | Chiba | G03B 13/10 |
| | | | 396/232 |
| 2009/0068455 A1 | 3/2009 | Albrecht et al. | |
| 2009/0103027 A1 | 4/2009 | Hughes et al. | |
| 2009/0115922 A1 | 5/2009 | Veerasamy | |
| 2009/0219603 A1 | 9/2009 | Xue | |
| 2009/0290078 A1 | 11/2009 | Yang et al. | |
| 2009/0296188 A1 * | 12/2009 | Jain | E06B 9/24 |
| | | | 359/245 |
| 2010/0101649 A1 * | 4/2010 | Huignard | B32B 17/10036 |
| | | | 136/261 |
| 2010/0118380 A1 | 5/2010 | Xue | |
| 2010/0279125 A1 | 11/2010 | Buyuktanir et al. | |
| 2010/0294679 A1 | 11/2010 | Griffiths et al. | |
| 2011/0102730 A1 | 5/2011 | Lee et al. | |
| 2012/0140147 A1 * | 6/2012 | Satoh | G03B 21/28 |
| | | | 349/62 |
| 2012/0262500 A1 * | 10/2012 | Kitazawa | G02B 5/008 |
| | | | 345/690 |
| 2013/0093969 A1 | 4/2013 | Li et al. | |
| 2013/0278989 A1 * | 10/2013 | Lam | B60J 3/04 |
| | | | 359/275 |

FOREIGN PATENT DOCUMENTS

| | | | |
|---|---|---|---|
| EP | 0598086 A1 | 5/1994 | |
| EP | 2128688 A1 | 12/2009 | |
| JP | S63-271233 A | 11/1988 | |
| JP | H05-232457 A | 9/1993 | |
| JP | H0675206 A | 3/1994 | |
| JP | H07-152023 A | 6/1995 | |
| JP | H09-127504 A | 5/1997 | |
| JP | 2003058065 A | 2/2003 | |
| JP | 2004093873 A | 3/2004 | |
| JP | 2004534282 A | 11/2004 | |
| JP | 2007065398 A | 3/2007 | |
| JP | 2007101643 A | 4/2007 | |
| JP | 2012030980 A | 2/2012 | |
| KR | 20000006089 A | 1/2000 | |
| WO | 2012/028823 A1 | 3/2012 | |
| WO | 2012045973 A1 | 4/2012 | |
| WO | WO 2012079159 A1 * | 6/2012 | B60J 3/04 |

OTHER PUBLICATIONS

Chen et al., "Electra-Optical Properties of Polymer Stabilized Cholesteric Texture Normal-Mode Light Shutter From Flexible Monomers," ALCOM Tech Report XI, 2000, pp. 223-229.
"Liquid Crystal Glass," retrieved from http://www.glazette.com/Glass-Knowledge-Bank-70/Liquid-Crystal-Glass.html on Oct. 1, 2013, 2 pages.
"Switchable Intelligent Glass—SGG Priva-lite Electrochromatic Glass," Saint Gobain Glass India, retrieved from http://in.saint-gobain-glass.com/b2c/default.asp?nav1=par&nav2=single%20pane&id=18978 on Oct. 1, 2013, 1 page.
"Transparent Display," Kent Optronics, retrieved from http://kentoptronics.com/transparent.html on Oct. 1, 2013, 1 page.

* cited by examiner

GLAZING UNIT COMPRISING A VARIABLE LIGHT SCATTERING SYSTEM AND A PAIR OF ABSORBING ELEMENTS

CROSS-REFERENCE

This application is a 35 U.S.C. 371 national stage filing from International Application No. PCT/FR2013/052607, filed Oct. 31, 2013 and claims priority to France Application No. 1260426 filed Oct. 31, 2012. The entire contents of these applications are incorporated herein by reference.

The invention relates to a glazing unit comprising at least one substrate coated with a variable light scattering system switching between a transparent state and a translucent state comprising a scattering layer capable of scattering incident light along scattering angles greater than the critical total internal reflection angle at the interface between the substrate and the air.

The invention also relates to a projection or back-projection method in which said glazing unit is used as a projection or back-projection screen.

The invention is more particularly aimed at the field of glazing units allowing image projection, light-blocking glazing units and glazing units switchable between a diffusing state and a transparent state.

The glazing units of the invention offer an ability to hide in the diffusing state that is greatly improved, together with excellent optical properties. The hiding ability of a glazing unit in the diffusing state corresponds to its capacity to not allow viewing through it. The quality of the transparent state and also the sharpness of the image in direct projection are improved with respect to glazing units comprising the same scattering layers because the residual diffusion halo, usually visible on this type of glazing unit, is reduced. Finally, these glazing units offer a transparent state with an aspect comparable to the transparent state of the glazing units of the prior art but using a lower switching voltage.

"Critical angle of total internal reflection" is understood to mean the angle above which any light radiation arriving on a separation surface or interface from a medium of higher optical index toward a medium of lower optical index with an angle of incidence greater than a value referred to as critical value is reflected by said surface or interface. The critical angle ($\theta c$) can be determined by applying Snell's equation and by replacing the angle of refraction by 90°. The critical angle ($\theta c$) of total internal reflection at the interface between a substrate and the air whose indices of refraction satisfy the relationship $n_{substrate} > n_{air}$ is:

$$\theta c = \sin^{-1}\left(\frac{nair}{nsubstrate}\right)$$

For example, the critical total internal reflection angle at the interface between a glass substrate with a refractive index of 1.54 and the air is around 40°.

The glazing units currently available on the market that are switchable between a transparent state and a diffusing state comprise a functional film composed of two substrates carrying an electrode taking the form of plastic sheets enclosing a layer incorporating drops of liquid crystals, the whole assembly being laminated by means of interlayer spacers or bonded between two glass substrates. When a voltage is applied to the film (ON state), the liquid crystals orient themselves along a preferred axis, which allows viewing through the functional film. With no applied voltage (OFF state), in the absence of alignment within the drops of liquid crystals, the film becomes diffusing and prevents viewing.

The switching glazing units currently available on the market, when they comprise for example an NCAP ("nematic curvilinear aligned phase") layer, having micro-drops with average dimensions of 5 µm, allow a direct projection with a low brightness but sharp, well-resolved and not blurred. On the other hand, the diffuse reflection of these glazing units is low in the transparent state and the visual impression is good. However, the glazing units incorporating these functional films offer a limited hiding ability.

The applicant has developed switching glazing units comprising liquid crystals not using the technology of functional films. These switching glazing units comprise a scattering layer directly encapsulated between two substrates preferably made of glass and not included between two supports carrying an electrode in the form of plastic sheets. The whole assembly formed by the substrates and the scattering layer is sealed by means of an O-ring seal or peripheral ribbon of adhesive. The patent applications WO 2012/028823 and WO 2012/045973 describe such glazing units. The use of this technique allows less costly glazing units to be fabricated by saving on the materials employed.

The switching glazing units developed by the applicant comprise a scattering layer comprising a multitude of drops of liquid crystals without preferred orientations to one another dispersed within a polymer matrix (hereinafter PDLC, "Polymer-Dispersed Liquid Crystal", layer). The drops have average dimensions less than 4 µm.

Surprisingly, these glazing units offer a good hiding ability together with a better quality for normal viewing in the transparent state, all at a lower cost. On the other hand, these glazing units have non-negligible drawbacks. The presence of a bright halo in the diffusing state is notably observed, which is a particular problem in the case of direct projection and an appearance degraded in angle in the transparent state. This degraded appearance is characterized by the presence of a white fogging attributed to diffuse light reflection in the drops of liquid crystals.

In order to explain the differences observed, the applicant has investigated the mechanisms governing these complex glazing units.

Since the scattering layers comprise particles dispersed within a matrix as scattering centers, they scatter the light differently according to the size and the density of the particles that they contain. The invention relates to diffusing layers comprising scattering centers dispersed within a volume having dimensions and a density such that the light passing through this medium undergoes Mie scattering. In order to observe this phenomenon, the size of the particles must be larger than the wavelengths in the visible range, typically one or a few micrometers.

When this type of scattering layer is illuminated in normal incidence, the spatial distribution of the scattered light in transmission is not isotropic and is highly dependent on the shape of the scattering centers (particles in the shape of a sphere, cylinder, platelet, etc.), on their size and on their density.

It is possible, for a given scattering layer, to determine its scattering indicator in transmission. This consists in illuminating the scattering layer in normal incidence and in measuring in transmission the intensity of the scattered rays as a function of the angle with respect to the initial direction of the illumination. This scattering indicator may be measured by means of an instrument measuring the bidirectional transmission distribution function, or BTDF, such as the tool REFLET from the company STIL. This index is obtained by measuring the light transmitted over an arc of −90° to 90° in the hemisphere opposite to that of the incident light, and consists of a curve in the form of a peak. "Scattering peak" is therefore understood to mean the intensity profile of the light radiation scattered by the scattering means in transmission. The information that may be extracted from these scattering indicators results from the height of the top of the peak, from the shape and from the width of the base of the peak. The top of the peak centered on 0° corresponds to the normal angle of incidence at which the light which has not been scattered exits.

A distinction must be made amongst the scattering layers whose scattering is explained by Mie scattering.

When the scattering layer comprises large particles, in other words particles having mean dimensions of around 5 µm or more, the scattering indicator has the shape of a virtually triangular peak. The half-width of the base of the triangle corresponds to the limiting angle (in absolute value) beyond which virtually no light ray is scattered ($\theta_{limit}$). It is then considered that the scattering indicator in transmission is very forward-directed.

Taking the case where a scattering layer of this type is deposited onto a substrate. The incident radiation first of all arrives on the scattering layer, is scattered there and subsequently arrives in the substrate. Given that the rays are not scattered at angles greater than the angle of total internal reflection between the interface of the substrate and the air ($\theta_{limit} < \theta c$), more than 95% of the scattered rays can exit from the substrate, typically 96%.

The analysis of the scattering indicators in transmission allows it to be shown that, when the scattering layer comprises particles with dimensions and with a density such that the scattering profile is forward-directed, practically no ray is scattered at angles greater than a limiting value. When this limiting value of angle is less than the critical total internal reflection angle of the substrate, a diffuse reflection is not observed. Whereas, it is the diffuse reflection which is able to generate a halo spoiling the sharpness in the case of a direct projection onto a glazing unit incorporating such a scattering layer. On the other hand, the low mean angular deviation of the rays which pass through the glazing unit with respect to their initial direction results in a poor hiding ability.

In contrast, when the scattering layer comprises smaller particles, in other words with mean dimensions less than 4 µm, the scattering indicator does not have a virtually-triangular peak shape. The scattering indicator may be divided into two main parts. A peak is obtained that is superposed onto a curve, referred to as "the base", exhibiting a bell shape. In this case, rays can be scattered at large angles. It is then considered that the scattering indicator in transmission is less forward-directed.

Taking the case where a scattering layer of this type is encapsulated between two substrates, the incident radiation first of all arrives on the first substrate, then on the scattering layer, where it is scattered, and subsequently arrives in the second substrate. Given that certain rays can be scattered at angles higher than the critical total internal reflection angle of the substrate ($\theta_{limit} > \theta c$), these rays cannot escape from the second substrate and are then trapped. These rays go back through the scattering layer and are therefore re-scattered. These rays can then get back out of the first substrate and again be scattered if their angle of incidence is less than the critical total internal reflection angle of the interface between the air and the first substrate. In the opposite case, these rays are again reflected and go back through the scattering layer. Depending on their angle of incidence, these rays will or will not be able to escape from the second substrate after a favorable scattering. The rays trapped by total internal reflection are therefore likely to return to the observer, notably after a certain number of reflections if the scattering layer is enclosed by several substrates. It is this phenomenon which creates the halo or white fogging effect because these rays come back out at a different place on the substrate.

The problem presented hereinabove relating to the trapping by total internal reflection is only posed if the scattering centers have mean dimensions such that rays are scattered at angles greater than the critical total internal reflection angle. In general, the scattering centers in this case have mean dimensions less than 4 µm, or better, less than 2 µm.

The analysis of the scattering indicators in transmission allows it to be shown that, when the scattering layer exhibits a scattering profile that is not very forward-directed, the largest mean angular deviation of the rays which pass through the glazing unit with respect to their initial direction seems to allow a better hiding ability to be obtained. However, in this case, a non-negligible part of the scattered rays is trapped inside of the glass by total internal reflection. This diffuse reflection is able to generate a halo spoiling the sharpness in the case of a direct projection onto a glazing unit incorporating such a scattering layer.

To this phenomenon observed in the diffusing state is to be added the influence of the angular dependency in the transparent state of the liquid crystals.

The ordinary refractive index of the liquid crystals is close to the refractive index of the polymer matrix in which the drops of liquid crystals are dispersed. The scattering layer appears "more transparent" when it is observed in the direction of the field which is generally normal to the surface of the glazing unit. On the other hand, when the glazing unit is illuminated with a high angle of incidence, the jump in index of the liquid crystals plays a role; some rays are scattered in transmission. The transparency decreases and gives rise to an increase of the diffuse reflection for oblique viewing angles. This phenomenon is explained by the fact that, when the angle of view moves away from the normal, the disparity between the effective refractive index of the liquid crystals and the refractive index of the matrix can be seen.

In the case of a layer where the scattering indicator is forward-directed, these scattered rays can exit from the glazing unit. The diffuse reflection is therefore low.

In the case of a glazing unit with a wider scattering indicator, rays with a more or less oblique incidence are able to "see" the liquid crystals in the transparent state and can be scattered. These scattered rays generate the same phenomenon as explained hereinabove. These rays may be trapped by total internal reflection and this will happen all the more easily the higher the angles of incidence. These rays will then be able to escape after a favorable scattering and to generate a bright halo or white fogging on the glazing unit when seen under a large angle of incidence. An appearance degraded in angle is thus observed in the transparent state owing to the high diffuse reflection.

For these switching glazing units, the liquid crystals are more ordered the higher the applied voltage and the closer to the switching voltage. According to the invention, switching voltage is understood to mean the DC voltage or RMS level of a sinusoidal signal starting from which haze values measured according to the standard ASTM D 1003 of less than 5% are obtained.

The switching voltage therefore corresponds to a minimum voltage of use in order to have a low haze. The haze corresponds to the quantity of the light transmitted which is scattered at angles of higher than 2.5°. The liquid crystals are more ordered (hence less hazy) the higher the applied voltage. When the applied voltage is too low, the liquid crystals are not sufficiently aligned and the scattering by the scattering layer is high. The white fogging on the glazing unit is then visible. This white fogging is the main cause of the impression of non-transparency for low scattering levels.

The optical properties of the glazing units comprising a scattering layer in contact with a substrate are highly dependent on the scattering centers contained in the scattering layer and on the substrate. The rays scattered by the scattering layer in the diffusing state or by the scattering layer in the transparent state under oblique incidence pass through the substrate which has a higher refractive index than air. When these scattered rays arrive at the interface between the substrate and the air, they can only escape if their angle of incidence is less than the critical total internal reflection angle. Depending on the choice of the scattering layer, a large part of the light may be scattered at large angles. However, any light ray scattered in a substrate with an angle greater than the angle of total internal reflection can be trapped within the latter and be detrimental to the optical properties of the glazing unit.

The aim of the invention is therefore to overcome the aforementioned drawbacks by improving the optical properties of the glazing units comprising a scattering layer able to scatter the light incident at scattering angles greater than the critical total internal reflection angle at the interface between the substrate and the air. Preferably, a scattering layer satisfies this criterion if a significant amount of the incident light is scattered along scattering angles higher than the critical total internal reflection angle at the interface between the substrate and the air; preferably at least 5% of the incident light is thus scattered.

The applicant has discovered that the addition of elements absorbing in the visible, on either side of a scattering layer such as defined hereinabove, allows the drawbacks associated with the diffuse reflection due to the total internal reflections to be overcome, or even totally eliminated.

The presence of such absorbing elements allows an attenuation of the diffuse reflection to be obtained that is much greater for the multiple reflections within the substrate than for the light transmission. The improvement relates both to the transparent state for which the residual diffuse reflection is decreased and to the scattering state for which the quality of the direct projection is improved when the glazing unit is used as a screen.

The reduction in the diffuse reflection obtained allows the surplus of diffuse reflection generated by the application of a lower voltage to the glazing unit to be compensated. Thus, an impression of transparency may be obtained that is similar to that obtained with the glazing units comprising a layer diffusing at the high angles but not incorporating said absorbing elements by applying a lower voltage.

The present invention relates to a glazing unit comprising a variable light scattering system switching between a transparent state and a translucent state comprising a scattering layer situated between two electrodes, said scattering layer comprising a mixture of liquid crystals forming micro-drops dispersed within a polymer matrix, said variable light scattering system being situated between two substrates carrying said electrodes characterized in that:

said scattering layer is able to scatter the incident light along scattering angles greater than the critical total internal reflection angle at the interface between the substrate and the air, the glazing unit comprises at least one pair of elements absorbing visible light separated from one another at least by the scattering layer.

The scattering layer according to the invention is preferably a PDLC layer. For a scattering layer of the PDLC layer type to be able to scatter the incident light along scattering angles greater than the critical total internal reflection angle at the interface between the substrate and the air, the drops of liquid crystals must have mean dimensions of less than 4 µm.

The present invention also relates to a glazing unit comprising a variable light scattering system switching between a transparent state and a translucent state comprising a scattering layer situated between two electrodes, said scattering layer comprising a mixture of liquid crystals forming micro-drops dispersed within a polymer matrix, said variable light scattering system being situated between two substrates carrying said electrodes being characterized in that:

the drops of liquid crystals have mean dimensions strictly less than 4 µm, the glazing unit comprises at least one pair of elements absorbing visible light separated at least by the scattering layer.

According to the invention, the term "variable light scattering system" includes the scattering layer and the two electrodes situated on either side of the scattering layer, and the term "glazing unit" includes at least the substrates carrying said electrodes and the variable light scattering system.

According to the invention, the elements are chosen from amongst the substrates, the coatings and/or the layers. "Element absorbing visible light" is understood to mean an element whose function is to increase the energy absorption of visible light, in other words in the wavelength range going from 380 to 780 nm. The energy absorption is measured according to the standard EN 410.

The elements absorbing in the visible, situated on either side of a scattering layer, are superposed onto the electrodes situated on either side of the scattering layer. Superposed is understood to mean that the absorbing elements such as the substrates, the coatings and/or the layers situated on either side of a scattering layer are situated on top of or underneath the electrode situated on the same side with respect to the scattering layer or, in the case of an absorbing coating, included within the electrode.

In an increasing order of preference, the glazing unit exhibits an energy absorption greater than 10%, greater than 20%, greater than 30%, greater than 40%. However, the choice of an absorbing element exhibiting an energy absorption that is more or less high could be a function of the properties sought. A compromise is sometimes necessary between maintaining a sufficiently high light transmission and the reduction of the fogging brightness.

According to the invention, the glazing unit comprises at least one pair of elements absorbing visible light.

Preferably, the absorbing elements of a same pair are identical. "Identical absorbing elements" is understood to mean substrates, coatings or layers of the same chemical nature and of the same thickness.

Preferably, the glazing unit of the invention exhibits a symmetry with respect to the variable light scattering system and/or to the scattering layer. A glazing unit exhibiting "a symmetry" according to the invention comprises pairs of identical elements whose identical elements of a same pair are placed symmetrically with respect to the variable light scattering system and/or to the scattering layer.

"Identical elements" is understood to mean substrates, coatings and/or layers of the same chemical nature and of the same thickness.

The scattering layer and the element absorbing in the visible are in optical contact, in other words they are not separated by a medium or element exhibiting a variation in refractive index with respect to the substrate or to the polymer matrix of the scattering layer greater than 0.1.

The glazing unit comprises a variable light scattering system comprising a scattering layer able to switch between a transparent state and a scattering state that is preferably electrically-controlled.

The methods of preparation of the PDLC layers comprise a step for phase separation in order to form the drops of liquid crystals dispersed within the polymer matrix. The nature, the concentration of the components in the precursor composition of the PDLC layer, the temperature and the operating conditions, notably the polymerization kinetics, influence the morphology of the micro-drops obtained and determine notably their size, their shape, their purity and potentially their interconnection (open or closed porosity).

The scattering layer comprising the liquid crystals has, in an increasing order of preference, a thickness of 3 to 50 µm, of 5 to 25 µm, of 10 to 20 µm or of 12 to 17 µm.

The micro-drops of liquid crystals have, in an increasing order of preference, mean dimensions in the range between 0.25 µm and 3.00 µm, between 1.00 and 2.50 µm, between 0.50 and 2.00 µm or between 0.70 and 1.00 µm (limits included).

A scattering layer comprising liquid crystals may be obtained by preparation of a precursor composition comprising a mixture of liquid crystals and a photopolymerizable composition. This precursor composition is applied in the form of a "layer" in contact with two electrode carrier substrates. During the polymerization or reticulation by UV light irradiation of said precursor composition, a polymer matrix is formed in which the liquid crystals are incorporated in the form of micro-drops. The scattering layer is therefore obtained by a step for phase separation induced by radical photopolymerization.

The liquid crystals are preferably nematic with a positive dielectric anisotropy. Examples of liquid crystals and of mixture of liquid crystals that are suitable according to the invention are described notably in the patents EP 0 564 869 and EP 0 598 086.

By way of mixture of liquid crystals being especially suitable according to the invention, the product marketed by the company Merck under the reference MDA-00-3506, comprising a mixture of 4-((4-ethyl-2,6-difluorophenyl)ethynyl)-4'-propylbiphenyl and of 2-fluoro-4,4'-bis(trans-4-propylcyclohexyl)biphenyl, may be used.

The polymer matrix can comprise a polymer or copolymer chosen from amongst polyethers, polyurethanes, polyvinyl alcohols (PVA), polyesters, polyacrylates and polymethacrylates.

Preferably, the polymer matrix is obtained starting from a photopolymerizable composition and comprises compounds able to undergo radical polymerization or reticulation under the action of a radiation, preferably UV. This photopolymerizable composition comprises monomers, oligomers and/or pre-polymers and a polymerization initiator.

According to one advantageous embodiment, the polymer matrix is obtained starting from a photopolymerizable composition comprising vinyl compounds. In the sense of the present invention, a "vinyl compound" is understood to mean a monomer, an oligomer, a pre-polymer, a polymer comprising at least one vinyl function $CH_2=CH-$ which, when it is subjected to the photopolymerization conditions, yields a polymer network having a solid structure. According to the invention, the term vinyl compound includes acrylate and methacrylate compounds comprising at least one function ($CH_2=CH-CO-O-$) or ($CH_2=C(CH_3)-CO-O-$).

The photopolymerizable composition according to the invention preferably comprises, by way of vinyl compounds, acrylate and/or methacrylate compounds (hereinafter (meth)acrylates). The specific choice of this type of polymer material allows a good phase separation to be obtained during the reticulation. This leads to a scattering layer having drops whose dimensions are uniform, even for small dimensions notably of the order of a micrometer, and whose density is high. In addition, the liquid crystals are well distributed within the drops and not dispersed in an isolated manner within the polymer matrix. Such a scattering layer scatters the incident light along scattering angles greater than the critical total internal reflection angle at the interface between the substrate and the air.

The (meth)acrylate compounds used according to the invention may be chosen from amongst monofunctional and polyfunctional (meth)acrylates such as mono-, di-, tri-, polyfunctional (meth)acrylates. Vinyl compounds that are suitable according to the present invention are for example described in the patent EP 0272 585, notably acrylate oligomers.

Advantageously, the photopolymerizable composition comprises, by mass with respect to the total mass of the photopolymerizable composition, in increasing order of preference, at least 50%, at least 60%, at least 70%, at least 80%, at least 90%, at least 95% of vinyl compounds.

As long as no solvent is used, once reticulated, the polymer matrix will therefore comprise at least 50% of polymer obtained by polymerization of the vinyl compounds. Preferably, the polymer matrix comprises in an increasing order of preference, by mass with respect to the total mass of the polymer matrix, at least 60%, at least 70%, at least 80%, at least 90%, at least 92%, at least 95% of polymers obtained by polymerization of the vinyl compounds.

According to one embodiment, the photopolymerizable composition comprising vinyl compounds comprises, by mass with respect to the total mass of the photopolymerizable composition, in an increasing order of preference, at least 50%, at least 60%, at least 70%, at least 80%, at least 90%, at least 95% of acrylate compounds and/or of methacrylate compounds.

The photopolymerizable composition can furthermore comprise 0.01 to 5% of a photo-initiator by mass with respect to the total mass of the photopolymerizable composition. By way of photo-initiators that are suitable according to the invention, 2,2-dimethoxy-1,2-diphenylethanone may be mentioned.

The polymerizable composition can comprise other polymerizable co-monomers such as mercaptans.

As example of photopolymerizable composition, a composition obtained starting from the product MXM 035 sold by Nematel may be mentioned. This product comprises:
- a mixture of two acrylate monomers, ethylhexyl acrylate and hexanediol diacrylate and of acrylate oligomers,
- a mercaptan,
- a photo-initiator.

Other examples of compositions based on acrylates and on mercaptans are described in the patents U.S. Pat. No. 4,891,152, EP 0564869 and EP 0 598 086.

According to one advantageous embodiment, the scattering layer is a PDLC layer satisfying the following characteristics alone or in combination:
- the polymer matrix is obtained starting from a photopolymerizable composition comprising vinyl compounds, preferably acrylate compounds or methacrylate compounds, and/or
- the proportions by mass of the mixture of liquid crystals with respect to the total mass of the mixture of liquid crystals and of photopolymerizable composition are in the range between 40 and 70%, preferably between 50 and 65%, and/or
- the PDLC layer has a thickness in the range between 5 and 25 μm, preferably between 10 and 30 μm, better between 10 and 20 μm or between 12 and 17 μm, and/or
- the mean diameter of the drops of liquid crystals dispersed within the polymer matrix is in the range between 0.25 μm and 2.00 μm, preferably between 0.70 and 1.00 μm.

A PDLC layer having the combination of these characteristics exhibits an excellent hiding ability. The mean dimensions of the drops and the relative proportions by mass of the mixture of liquid crystals with respect to the photopolymerizable composition may be indirectly correlated to the density of the drops in the PDLC layer (assuming that very little of the liquid crystals are dissolved in the polymer matrix).

The scattering layer may furthermore comprise spacers. The spacers may be made of glass such as glass beads or of a hard plastic material for example polymethyl methacrylate (PMMA) or divinylbenzene polymer. These spacers are preferably transparent and preferably have an optical index substantially equal to the refractive index of the polymer matrix. The spacers are made of a non-conducting material.

A method of encapsulation between two glass substrates with electrodes of a scattering layer comprising liquid crystals in a polymer material is described in the application WO 2012/045973.

The variable light scattering system may extend over the whole surface of the glazing unit or over at least one part of the glazing unit.

The scattering layer is situated between two electrodes, the electrodes being in direct contact with the scattering layer. The electrodes comprise at least one electrically-conducting layer.

The electrically-conducting layer can comprise transparent conducting oxides (TCO), in other words materials which are both good conductors and transparent in the visible, such as indium oxide doped with tin (ITO), tin oxide doped with antimony or with fluorine ($SnO_2$: F) or zinc oxide doped with aluminum (ZnO: Al). An electrically-conducting layer based on ITO exhibits a sheet resistance from 50 to 200 ohms per square.

These electrically-conducting layers based on conducting oxides are preferably deposited with thicknesses of the order of 50 to 100 nm.

The electrically-conducting layer may also be a metal layer, preferably a thin layer or a stack of thin layers, referred to as TCC (for Transparent Conductive Coating), for example of Ag, Al, Pd, Cu, Pd, Pt, In, Mo, Au and typically with a thickness between 2 and 50 nm.

These electrically-conducting layers may be deposited directly onto a substrate or onto an intermediate layer of a substrate, by a large number of known techniques such as sputtering assisted by a magnetic field, evaporation, the sol-gel technique, and also techniques of vapor-phase deposition (CVD).

The electrodes comprising an electrically-conducting layer are connected to a power supply. The electrodes can then be deposited directly onto one face of a substrate and thus form the electrode carrier substrates.

The elements absorbing in the visible, situated on either side of a scattering layer, are superposed onto the electrically-conducting layers of the electrodes situated on either side of the scattering layer. The absorbing elements such as the substrates, the coatings and/or the layers situated on either side of a scattering layer are therefore situated on top of or underneath the electrically-conducting layer of the electrode situated on the same side with respect to the scattering layer.

The glazing unit comprises two electrode carrier substrates and can furthermore comprise other substrates potentially laminated with the electrode carrier substrates. The substrate or substrates, electrode carriers or others, may be chosen to be rigid, semi-rigid or flexible, mineral or organic, for example they may be made of glass or polymer.

The glass substrates can be chosen from amongst the glass substrates marketed by the company Saint-Gobain Glass in the DIAMANT® or Planilux® range. The glass substrates preferably have a thickness in the range between 0.4 and 12 mm, preferably 0.7 and 6 mm.

The polymer substrates may comprise polymers chosen from amongst:
- polyesters such as polyethylene terephthalate (PET), polybutylene terephthalate (PBT), polyethylene naphthalate (PEN);
- polyacrylates such as polymethyl methacrylate (PMMA);
- polycarbonates;
- polyurethanes;
- polyamides;
- polyimides;
- fluorinated polymers like fluoroesters such as ethylene tetrafluoroethylene (ETFE), polyvinylidene fluoride (PVDF), polychlorotrifluoroethylene (PCTFE), ethylene chlorotrifluoroethylene (ECTFE), fluorinated ethylene-propylene (FEP) copolymers;
- photoreticulatable and/or photopolymerizable resins, such as thiolene, polyurethane, urethane-acrylate, polyester-acrylate resins and
- polythiourethanes.

The substrates may be laminated together by virtue of the use of interlayer spacers of plastic material which may be thermoformed or is sensitive to pressure. These interlayer spacers can be based on polymers chosen from amongst polyvinylbutyrals (PVB), polyvinyl chlorides (PVC), polyurethanes (PU), polyethylene terephthalate or ethylene vinyl acetates (EVA). The interlayer spacers preferably have a thickness in the range between 10 μm and 2 mm, preferably in the range between 0.3 and 1 mm.

The electrode carrier substrates are preferably glass substrates, for example flat float-glass sheets.

The element absorbing in the visible may be an absorbing substrate, an absorbing layer and/or an absorbing coating.

The absorbing substrates may be chosen from amongst:
- substrates tinted in the bulk,
- substrates comprising an absorbing coating.

The absorbing substrates may be made of glass or polymer, rigid or flexible.

By way of absorbing substrate made of glass tinted in the bulk by suitable dyes, the range of glasses marketed under the trade name PARSOL® by the company SAINT-GOB- AIN GLASS may especially be used. These glasses tinted in the bulk advantageously have one or more of the following characteristics:
- a light transmission of at least 50% measured according to the standard EN 410,
- an energy absorption of at least 10% measured according to the standard EN 410.

By way of absorbing polymer substrate tinted in the bulk, thermoplastic substrates of the type of sheet that is used as interlayer spacer in laminated glazing units may be mentioned. This can be polyvinylbutyral PVB, polyurethane PU, ethylene vinyl acetate EVA.

The absorbing element may be chosen from amongst the absorbing coatings comprising at least one absorbing thin film. The absorbing coating is disposed on one of the faces of a substrate forming a part of the glazing unit. The absorbing element is then a substrate comprising an absorbing coating. The absorbing coating may therefore comprise a superposition of thin layers, at least one of which is absorbing in the visible.

A thin film is understood to mean a layer of thickness less than 1 µm. By way of absorbing thin film, the following may be mentioned:
- layers based on oxides of nickel and/or of iron and/or of chrome,
- layers that are essentially metal, for example based on one of the following metals: nickel Ni, chrome Cr, Ni—Cr alloy, steel, Inconel alloy, Au or Au alloy, silver Ag or Ag alloy, copper Cu.
- layers based on metal nitride(s), of the TiN or ZrN type.

These absorbing layers can be deposited for example by a thermal decomposition technique such as a pyrolysis in the gaseous phase, by a vacuum technique such as sputtering notably assisted by magnetic field or by sol-gel.

When a coating absorbing in the visible is used, the latter may be deposited onto any one of the faces of the various substrates forming the glazing unit. The substrate comprising said coating which absorbs in the visible advantageously has one or more of the following characteristics:
- a light transmission of at least 50% measured according to the standard EN 410,
- an energy absorption of at least 10% measured according to the standard EN 410.

The absorbing coating or coatings can form part of the electrodes enclosing the scattering layer. The electrode then comprises:
- at least one electrically-conducting layer and one absorbing layer, or
- at least one electrically-conducting absorbing layer.

According to one embodiment of the invention, the glazing unit comprises at least one absorbing substrate laminated by virtue of an interlayer spacer to an electrode carrier substrate. Preferably, the glazing unit comprises at least one pair of absorbing substrates laminated by virtue of interlayer spacers to each of the electrode carrier substrates.

A glazing unit of the invention can therefore comprise the following multilayer:
- a substrate made of tinted glass,
- a lamination interlayer spacer,
- a substrate composed of a clear glass,
- an electrode,
- a scattering layer,
- an electrode,
- a substrate composed of a clear glass,
- a lamination interlayer spacer,
- a substrate made of tinted glass.

According to another embodiment of the invention, the glazing unit comprises at least one electrode carrier substrate which is an absorbing substrate, in other words an absorbing electrode carrier substrate. Preferably, the glazing unit comprises at least one pair of absorbing electrode carrier substrates.

The glazing unit of the invention may therefore be composed of two substrates made of tinted glass and of a variable light scattering system comprising two electrodes and a scattering layer.

According to another embodiment of the invention, the electrode or electrodes comprise a coating absorbing in the visible.

Figure 1:
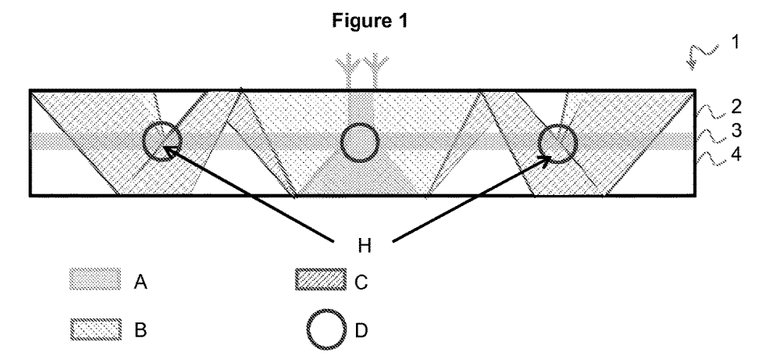

FIG. 1 is a diagram showing a glazing unit 1 comprising a scattering layer 3 comprising a wide scattering indicator encapsulated between two substrates 2 and 4. The areas referenced A, B, C, D and H respectively represent the incident light, the light that can escape from the glass, the light trapped by total internal reflection, the scattering of the incident light and the halo.

It is observed that the first diffuse reflection passes through twice the thickness of substrate as the transmitted light. The additional reflections travel through an even greater thickness of substrate and notably 4 times as much for the halo. By adding an absorbing element such as an absorbing glass or an absorbing layer along the path of the rays, the diffuse reflection is more rapidly attenuated, whether this be the projection halo or diffuse reflection in the transparent state, than the light transmission through the glazing unit.

The solution of the invention therefore allows the optical performance of the glazing unit to be improved without significantly degrading the light transmission. The switching glazing units in the transparent state see their large-angle diffuse reflection decrease much faster than the light transmission. It is possible to take advantage of this reduction in diffuse reflection in order to also reduce the applied voltage, obtaining a result for the transparent state comparable to the initial glazing unit, in other words without absorbing element.

The invention also relates to the use of a glazing unit such as defined hereinabove as a projection or of back-projection screen together with a method of projection or of back-projection according to which there is a glazing unit such as defined hereinabove is used as a projection or back-projection screen and a projector, said method consisting in projecting, by means of the projector, images visible by viewers on one of the sides of the glazing unit.

A projection screen comprises two faces or surfaces. One main face, onto which the image coming from the light source is projected, positioned in the same region of space as the light source (direct projection). One opposite face on which appears, potentially by transparency, the image projected onto the main face.

Back-projection screens have a main face and an opposite face possessing the same characteristics as those of the aforementioned projection screens. On the other hand, a back-projection screen differs from a projection screen in that the user and the light source are not situated in the same region of space but are located on either side of the screen.

The quality of a screen formed by a glazing unit depends on the transmission and reflection properties of the glazing unit. As a general rule, the lower the light transmission, the higher the light reflection, and the better will be the quality of a screen used in direct projection. The projection in reflection is significantly improved on scattering glazing units having a scattering layer with a wide scattering indicator.

Preferably, the glazing unit is used as a projection screen operating in reflection mode, in other words with the viewers and the projector situated on the same side of the glazing unit used as a projection screen. The glazing unit may however be used as a back-projection screen operating in transmission, in other words with the viewers and the projector situated on either side of the glazing unit.

Lastly, the invention also relates to the use of such a glazing unit operating with a switching voltage less than 30 Vrms.

The glazing unit according to the invention can be used on a façade or as an internal partition (between two rooms or within one space) in a building. More particularly, the glazing unit of the invention is particularly useful as an internal partition of a meeting room for projecting presentations. It is possible to switch between the transparent state and the diffuse state.

The glazing unit according to the invention is capable of being used for all known applications of glazing units, such as for vehicles, buildings, urban furnishings, interior decoration, lighting, display screens. The transparent glazing unit of the invention can therefore be used on a façade, on a window, on an interior partition usable as a projection screen for meeting rooms or display windows. The glazing unit may also be used for museography or publicity at a point of sale as advertizing support.

EXAMPLE

I. Materials Used

1. Substrates and Interlayer Spacers

The transparent substrates used are Planilux® glass substrates marketed by the company Saint-Gobain. These substrates have a thickness of 4 mm.

The substrates absorbing in the visible are Parsol® Bronze glass substrates marketed by the company Saint-Gobain having a thickness of 4 mm, a light transmission of 60% and an energy absorption of 34%.

The coatings absorbing in the visible used, previously deposited onto flat glass substrates of 6 mm in thickness, are as follows:
- a multilayer comprising a layer based on silver referenced KN 169 at Saint-Gobain exhibiting, when it is deposited onto the substrate, a light transmission TL of 69% and a light absorption of at least 30%,
- a multilayer comprising a layer based on stainless steel referenced SKN 144 at Saint-Gobain exhibiting, when it is deposited onto the substrate, a light transmission TL of 44% and a light absorption of at least 30%.

These substrates may be laminated by for example using an interlayer spacer of PVB or of EVA.

2. Variable Light Scattering Systems (SDLV) and Glazing Units

A functional film marketed by the company NSG under the trade name "UMU FILM" has been used. This film comprises two sheets of PET each carrying an electrode composed of a layer of ITO of around 50 nm and with a resistance of around 100 ohms per square and a layer of liquid crystals of the NCAP type. The assembly consisting of the NCAP layer and of the two electrodes is called SDLVA. According to the information available on this functional film, the layer of liquid crystals is obtained according to NCAP technology and comprises drops of liquid crystals having a diameter of around 5 µm.

The SDLVB comprises a PDLC layer obtained by phase separation induced by UV radical polymerization using the mixture of liquid crystals marketed by the company Merck under the reference MDA-00-3506 and a photopolymerizable composition in the presence of a spacer. The photopolymerizable composition is obtained based on the product MXM 035 marketed by Nematel®. This product in two parts A and B comprises:
- a mixture of two acrylate monomers, ethylhexyl acrylate and hexanediol diacrylate and of acrylate oligomers (part B),
- a mercaptan (part A),
- a photoinitiator for its UV polymerization (part A).

The spacers are beads marketed under the trade name Sekisui Micropearl of 15 µm in mean diameter.

The SDLVB is placed between two glass substrates. In order to obtain the glazing units incorporating the SDLVB, the following steps are carried out:
- a layer of ITO of around 50 nm and with a resistance of around 100 ohms per square is deposited by a magnetron process onto a Planilux® or Parsol® glass substrate so as to form an electrode carrier substrate,
- a seal using an acrylate adhesive bond is applied around the edge of the glass substrate,
- the precursor composition of the PDLC layer comprising the photopolymerizable composition, the mixture of liquid crystals and the spacers is deposited onto an electrode carried by a substrate,
- a second substrate coated with an electrode is deposited onto the first substrate with the two conducting layers of the electrodes face-to-face and separated by the layer of precursor composition of the PDLC layer,
- the two glass sheets are pressed together,
- the whole assembly is exposed to UV radiation.

| Scattering Layer | SDLVA | SDLVB |
|---|---|---|
| Technology | NCAP | PDLC |
| Type of liquid crystals | Nematic | Nematic |
| Mean dimensions of the drops (µm) | 5 | 0.74 |
| Nature of the polymer | Not specified | acrylate |
| Proportions of mixture of liquid crystals | Not specified | 50-55% |
| Thickness of the layer | Not specified | 15 µm |

II. Description of the Glazing Units

| Multilayer | Comp. 1 | Inv. 0 | Inv. 1 | Inv. 2 | Inv. 3 | Inv. 4 |
|---|---|---|---|---|---|---|
| Substrate/Layer | Planilux | — | Parsol | — | KN169 | SKN144 |
| Interlayer spacer | EVA | — | PVB | — | PVB | PVB |
| Substrate/Layer | PET | Planilux | Planilux | Parsol | Planilux | Planilux |
| SDLV substrate | SDLVA PET | SDLVB Planilux | SDLVB Planilux | SDLVB Parsol | SDLVB Planilux | SDLVB Planilux |
| Interlayer spacer | EVA | — | PVB | — | PVB | PVB |
| Substrate/layer | Planilux | — | Parsol | — | KN169 | SKN144 |
| TL % | 75% | 84.8% | 36.3% | 37.3% | 48% | 19% |

III. Determination of the Scattering Indicators in Transmission

Figure 3:
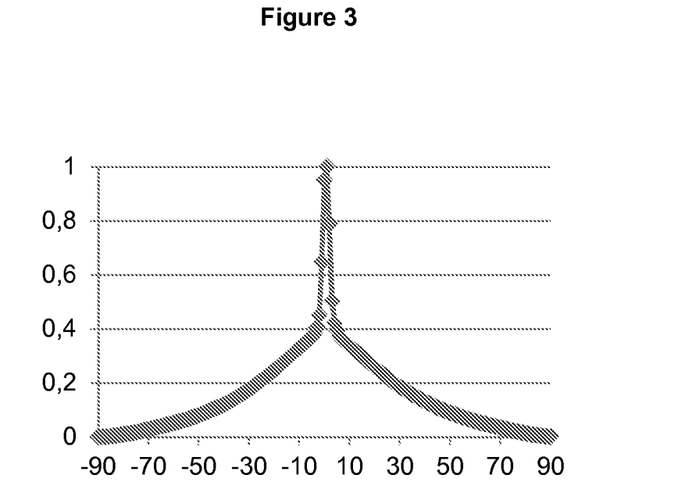
Figure 4:
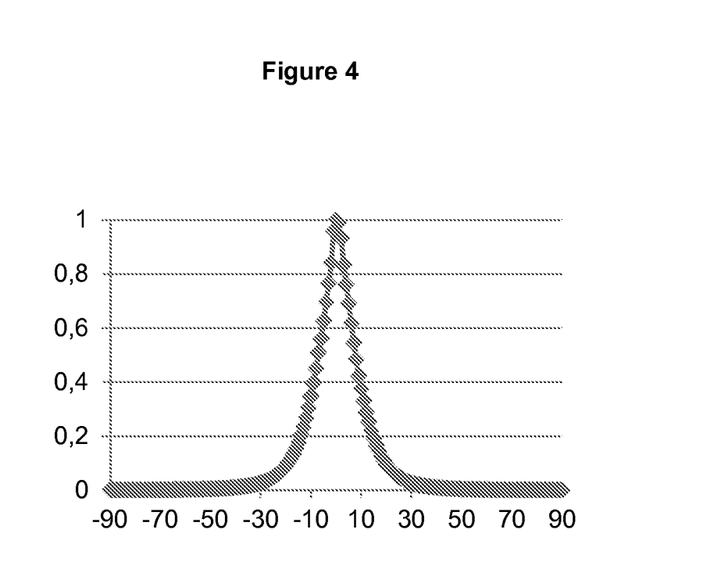

FIGS. 3 and 4 respectively show the scattering indicators of the glazing units Inv.0 and Comp.1 incorporating the variable light scattering systems SDLVB and SDLVA. These indicators show, as a function of the scattering angle in the range between −90° and 90°, the intensity of the transmitted light (normalized between 0 and 1). These profiles have been measured using the test bench REFLET marketed by the company STIL.

FIG. 3 corresponds to the scattering indicator of a glazing unit developed by SAINT-GOBAIN (Inv. 0) comprising the SDLVB placed between two Planilux® glass sheets themselves laminated between two Parsol® glass sheets. The scattering indicator in transmission for the glazing unit Inv. 0 exhibits:
- a sharp peak in the center corresponding to the least deflected part of the rays,
- a bell curve underneath the peak corresponding to the major part of the rays scattered at large angles.

Thus, the whole angular range is explored, and rays emerge from the substrate with angles going up to 90°. It is therefore observed that, for the glazing unit Inv.0 comprising a layer scattering the incident light along scattering angles greater than the critical total internal reflection angle at the interface between the substrate and the air (θc is around 40°), a part of the rays cannot get out owing to the total internal reflection.

FIG. 4 corresponds to the scattering indicator of the glazing unit Comp. 1 comprising the SDLVA system included between sheets of PET, the whole assembly being laminated between two Planilux® glass sheets. The scattering indicator in transmission for the glazing unit comp. 1 is much more pointed. The rays do not go beyond 40° in air. This means that the scattered rays for the scattering layer arrive at the glass/air interface with a maximum incident angle of 25° corresponding to an angle of incidence lower than the critical total internal reflection angle at the interface between the substrate and the air of around 40°. The phenomenon of diffuse reflection is not observed for these glazing units but the hiding ability is reduced.

IV. Evaluation of the Quality of the Screens

1. Assessment of the Visual Aspect in the ON State

The improvement of the visual aspect in the ON state (transparent) of the glazing units has been assessed. A panel of several persons has visually assessed the diffuse reflection of several glazing units corresponding to the presence or otherwise of a white fogging or bright halo. These glazing units are observed at an angle in the range between 50° and 60°. The panel has assigned for each glazing unit an assessment indicator chosen from amongst: "−" presence of a marked white fogging indicating a strong diffuse reflection, "0" slight white fogging indicating a weak diffuse reflection, "+" absence of white fogging indicating the absence of visible diffuse reflection.

| | Assessment indicator |
|---|---|
| Inv. 0 | − |
| Comp. 1 | + |
| Inv. 1 | + |
| Inv. 3 | + |
| Inv. 4 | + |

Figure 2:
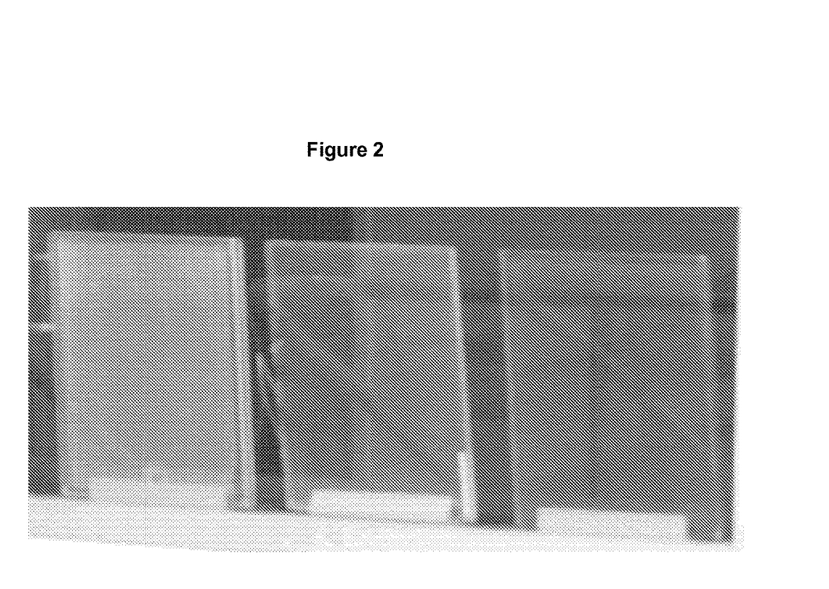

FIG. 2 shows a photograph of the following glazing units (from left to right): Inv. 0, Comp.1 and Inv.2. The diffuse reflection is very visible for the glazing unit Inv.0 comprising a layer scattering the incident light along scattering angles greater than the critical total internal reflection angle at the interface between the substrate and the air and not comprising any absorbing element. In comparison, for the glazing unit according to the invention Inv.1 furthermore comprising two absorbing substrates, the panel does not observe any white fogging and hence no diffuse reflection. The coloring or tint for the glazing unit Inv.1 comes from the fact that the glass PARSOL® is colored in addition to simply being absorbing, but this is not necessary and a neutral absorbing glazing unit would produce the same effect.

Finally, by comparing the glazing unit Comp.1 comprising a layer not scattering the incident light along scattering angles greater than the critical total internal reflection angle at the interface between the substrate and the air and the glazing unit of the invention Inv. 1, surprisingly better results are observed in terms of absence of diffuse reflection for the glazing unit according to the invention Inv.1.

The glazing units Inv.3 and Inv.4 respectively comprising a substrate comprising an absorbing coating KN 169 exhibiting a TL of 69% and an absorbing coating SKN 144 exhibiting a TL of 44% have a more neutral tint than the glazing unit Inv.1. The effect of a reduction in the diffuse reflection is still clearly present and effective.

2. Quantitative Measurement of the Quality of the Transparent State of the Glazing Units

| | Voltage: 30 V | | Voltage: 12 V | |
|---|---|---|---|---|
| | Inv. 0 | Inv. 1 | Inv. 0 | Inv. 1 |
| Transmission at 0° | 100% | 43% | 99% | 40% |
| Diffuse reflection at 0° | 100% | 21% | 163% | 35% |
| Ratio Trans./Diff. Reflection at 0° | 1.00 | 2.07 | 0.61 | 1.14 |
| Improvement at 0° | 0% | +107% | −39% | +14% |
| Diffuse reflection at 30° | 218% | 26% | 351% | 32% |
| Ratio Trans./Diff. Reflection at 30° | 0.46 | 1.66 | 0.28 | 1.24 |
| Improvement at 30° | 0% | +263% | −39% | +171% |

The values of transmission and of diffuse reflection have been measured in the ON state by applying voltages of 30 Vrms corresponding to the nominal voltage and of 12 Vrms corresponding to a low voltage ideal for a bathroom, the power being supplied by an AC voltage at 50 Hz. These values of transmission and of diffuse reflection have been measured at 0° and at 30° with respect to the normal to the glazing unit.

In the table, the value of the diffuse reflection and of the transmission of the glazing unit Inv.0 are taken as 100% by convention, the other values thus being normalized to the latter.

The ratio between the light transmission and the light reflection is considered as a figure of merit of the esthetic aspect of the glazing unit. Finally, the improvement is the ratio between this figure of merit with respect to that of the glazing unit Inv.0 at 30 Vrms and hence the improvement with respect to the latter.

At 0°, in other words directly facing:
for an applied voltage of 30 Vrms, the performance of the glazing unit Inv. 1 is 2 times better than that of the glazing unit Inv. 0,
the performance of the glazing unit Inv.1 at 12 V is comparable with or even greater than that of the glazing unit Inv.0 at 30 V.

Going above 30°, the performance of the glazing unit Inv.0 falls dramatically with respect to 0°. This is not the case for the glazing unit with absorbing glass Inv.1, which maintains a virtually-constant performance between 30° and 0°.

Thus, the invention allows both the level of performance of the glazing unit to be maintained while reducing the voltage to 12 V, and this good performance to be maintained including in angle.

3. Assessment as a Projection Screen

Figure 5:
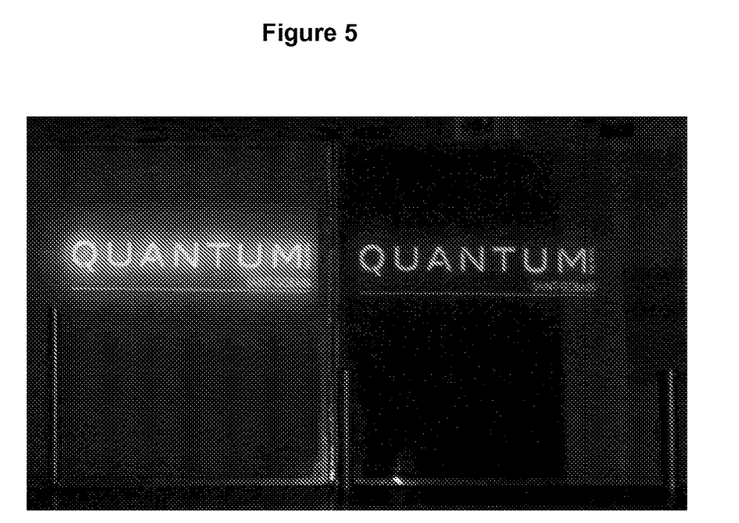
Figure 6:
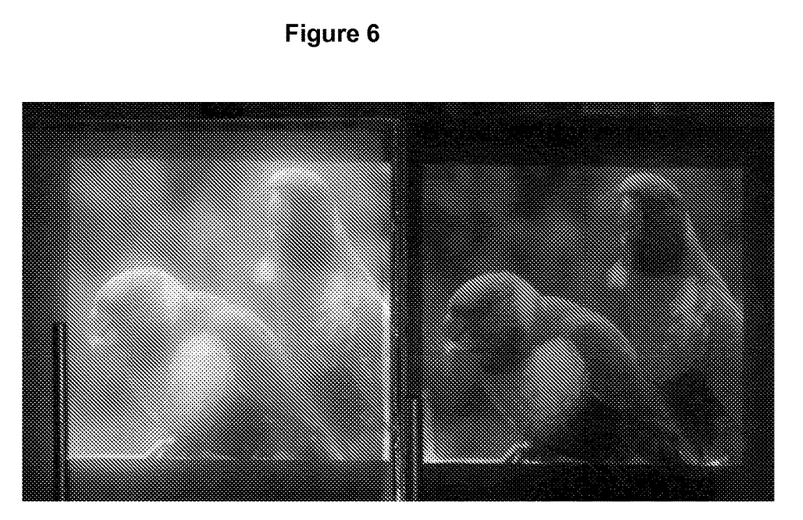

A panel of several persons has visually assessed the diffuse reflection of glazing units corresponding to the presence or otherwise of a white fogging or bright halo when an image is projected in direct projection mode. The projected image evaluated by the panel has been photographed and is the subject of FIGS. 5 and 6 each comparing the direct projection onto a glazing unit according to Inv.0 (on the left) with respect to a glazing unit according to the invention Inv.1 (on the right). For each image projected onto a glazing unit, the panel has assigned an assessment indicator chosen from amongst:

"−" presence of a white fogging or marked halo resulting from a strong diffuse reflection,
"0" slight white fogging corresponding to a low diffuse reflection,
"+" absence of white fogging corresponding to the absence of any visible diffuse reflection.

| Assessment indicator | |
|---|---|
| Inv. 0 | − |
| Inv. 1 | + |

Whereas the halo is clearly present for the glazing unit Inv.0 and does not allow an acceptable quality of image to be obtained, the latter is absent in the glazing unit laminated with the absorbing glass Inv.1. On the other hand, it is clear that the overall brightness of the image is reduced. This is of course expected, but the reduction in the halo achieved is much more significant.

The invention claimed is:

1. A glazing unit comprising a variable light scattering system switching between a transparent state and a translucent state comprising a scattering layer comprising liquid crystals situated between two electrodes, said variable light scattering system being situated between two substrates carrying said electrodes, wherein:
said scattering layer is able to scatter incident light along scattering angles greater than a critical total internal reflection angle at an interface between one of the two substrates and air, and
the glazing unit comprises at least one pair of elements absorbing visible light separated from one another at least by the scattering layer.

2. The glazing unit as claimed in claim 1, wherein the glazing unit exhibits an energy absorption greater than 10%.

3. The glazing unit as claimed in claim 1, wherein each element absorbing visible light in the at least one pair of elements is identical.

4. The glazing unit as claimed in claim 1, wherein the at least one pair of elements absorbing visible light are arranged symmetrically with respect to at least one of the variable light scattering system and the scattering layer.

5. The glazing unit as claimed in claim 1, wherein substrates are glass substrates.

6. The glazing unit as claimed in claim 1, wherein the at least one pair of elements absorbing visible light comprise at least one of an absorbing substrate and an absorbing coating.

7. The glazing unit as claimed in claim 1, wherein the at least one pair of elements absorbing visible light comprise at least one absorbing substrate laminated by means of an interlayer spacer to one of the substrates.

8. The glazing unit as claimed in claim 1, wherein the at least one pair of elements absorbing visible light comprises at least one pair of absorbing substrates laminated by means of interlayer spacers to each of the substrates.

9. The glazing unit as claimed in claim 1, wherein at least one of the electrodes comprises a coating absorbing in the visible wavelength range.

10. The glazing unit as claimed in claim 1, wherein the at least one pair of elements absorbing visible light exhibit:
a light transmission of at least 50%, and
an energy absorption of at least 10%.

11. The glazing unit as claimed in claim 1, wherein the two substrates comprise a first substrate composed of clear glass and a second substrate composed of clear glass, the pair of elements absorbing visible light comprise a first substrate made of tinted glass and a second substrate made of tinted glass, and the glazing unit comprises a multilayer structure having the following layers, in sequential order:
the first substrate made of tinted glass,
a first lamination interlayer spacer,
the first substrate composed of a clear glass,
a first one of the two electrodes,
the scattering layer,
a second one of the two electrodes,
the second substrate composed of a clear glass,
a second lamination interlayer spacer,
the second substrate made of tinted glass.

12. The glazing unit as claimed claim 1, wherein the pair of elements absorbing visible light comprise two substrates made of tinted glass.

* * * * *